US005711835A

United States Patent [19]

Dona et al.

[11] Patent Number: 5,711,835

[45] Date of Patent: Jan. 27, 1998

[54] METHOD OF MACHINING A DRUM-SHAPED WORKPIECE FOR AN X-RAY DIAGNOSIS APPARATUS OR PHOTOCOPIER

[75] Inventors: Marinus J. J. Dona; Hendrik Pranger; Louis A. Mensch; Gilbert M. Verbeek, all of Eindhoven, Netherlands

[73] Assignee: U.S. Philips Corporation, New York, N.Y.

[21] Appl. No.: 561,965

[22] Filed: Nov. 22, 1995

[30] Foreign Application Priority Data

Nov. 24, 1994 [EP] European Pat. Off. .............. 94203416

[51] Int. Cl.$^6$ ...................................................... B32B 31/40

[52] U.S. Cl. ............................ 156/154; 82/170; 156/153; 156/155; 156/344; 269/47; 269/50; 451/460

[58] Field of Search .................................... 156/153, 154, 156/155, 344; 451/460; 82/170; 269/47, 50, 55

[56] References Cited

U.S. PATENT DOCUMENTS

| | | | |
|---|---|---|---|
| 3,475,867 | 11/1969 | Walsh | 451/460 X |
| 3,888,053 | 6/1975 | White et al. | 451/460 X |
| 4,098,031 | 7/1978 | Hartman et al. | 451/460 X |
| 4,773,951 | 9/1988 | Moffatt et al. | 156/153 |

FOREIGN PATENT DOCUMENTS

| | | |
|---|---|---|
| 0456322 | 11/1991 | European Pat. Off. . |
| 2506684 | 8/1976 | Germany . |
| 280924 | 7/1990 | Germany . |
| 1052349 | 7/1983 | U.S.S.R. . |

*Primary Examiner*—Jeff H. Aftergut
*Attorney, Agent, or Firm*—Jack D. Slobod

[57] ABSTRACT

A drum-shaped workpiece (37) is machined according to a method whereby the workpiece (37) is fastened to a rotatable holder (1) of a machine tool (3) by means of an adhesive (45), for example a mixture including rosin and beeswax, such that a centerline (51) of the workpiece (37) coincides substantially with an axis of rotation (19) of the holder (1). This adhesive (45) is exclusively provided between the holder (1) and support surfaces (47, 49) of the workpiece (37) directed substantially parallel to the centerline (51), the workpiece (37) being brought into connection with the holder (1) exclusively via the adhesive (45). It is achieved thereby that mechanical stresses in the workpiece (37) caused by the fastening of the workpiece (37) to the holder (1) are as small as possible. A dimensional accuracy which the workpiece (37) has after being machined by the machine tool (3) and before being removed from the holder (1) thus remains intact when the workpiece (37) is removed from the holder (1). A drum-shaped carrier (83) manufactured by the method is used as a carrier of a selenium layer (101) in an X-ray diagnosis apparatus (85). A further drum-shaped carrier (107) manufactured by the method is used as a carrier for a selenium layer (129) in a photocopier (109).

13 Claims, 6 Drawing Sheets

METHOD OF MACHINING A DRUM-SHAPED WORKPIECE FOR AN X-RAY DIAGNOSIS APPARATUS OR PHOTOCOPIER

BACKGROUND OF THE INVENTION

The invention relates to a method of machining a drum-shaped workpiece, by which method the workpiece is fastened to a holder of a machine tool, which holder is rotatable about an axis of rotation, a centerline of the workpiece coinciding substantially with the axis of rotation, and the workpiece is subsequently machined by means of a tool which is displaced at least in a direction parallel to the axis of rotation by means of a positioning device of the machine tool.

The invention further relates to a holder suitable for use in a method according to the invention.

The invention also relates to an X-ray diagnosis apparatus provided with an X-ray source for irradiating an object with an X-ray beam, an X-ray-sensitive transducer for converting X-rays into a pattern of electric charges, and a read-out unit for reading out the pattern of electric charges, the X-ray-sensitive transducer being provided on a drum-shaped carrier which is rotatable about an axis of rotation by means of a drive unit.

The invention also relates to a photocopier provided with a light source for illuminating an original, a photosensitive transducer for converting light into a pattern of electric charges, a feed unit for the supply of toner to the photosensitive transducer, and a printing member for printing a toner pattern present on the transducer onto a copy to be manufactured, the photosensitive transducer being provided on a drum-shaped carrier which is rotatable about an axis of rotation by means of a drive unit.

A method of machining a drum-shaped workpiece of the kind mentioned in the opening paragraph is generally known and widely used. A drum-shaped workpiece which has already undergone preparatory operations is, for example, given a desired outer diameter, a desired inner diameter, a desired wall thickness, or a desired surface smoothness by means of such a method. In doing so, the workpiece is fastened to the holder of the machine tool by means of generally known, usual fasteners such as, for example, a clamping device with a number of individual clamping elements which are displaceable perpendicularly to the axis of rotation, which individual clamping elements bear with pretension on an outer wall or inner wall of the drum-shaped workpiece adjacent an end of the workpiece and exert a clamping force on the workpiece transversely to the workpiece centerline, a clamping device with two systems of mechanical blade springs, which systems of blade springs each bear with pretension on one of the two ends of the drum-shaped workpiece and exert a clamping force on the workpiece parallel to the workpiece centerline, or a clamping device with two annular clamping elements which are interconnected by tension rods extending parallel to the axis of rotation, which annular clamping elements each bear with pretension on one of the two ends of the drum-shaped workpiece and likewise exert a clamping force on the workpiece parallel to the workpiece centerline. Said fasteners offer the tool ready access to the inner wall or outer wall of the drum-shaped workpiece, so that the entire inner or outer wall of the drum-shaped workpiece can be machined in only one operation in a simple manner.

A disadvantage of the known method is that mechanical stresses are present in the drum-shaped workpiece during machining of said workpiece, which stresses are caused by the clamping forces exerted on the workpiece by the fasteners used. The workpiece is elastically deformed by these mechanical stresses. When the workpiece is released from the machine tool holder after machining, these mechanical stresses are released, so that said elastic deformation of the workpiece is at least partly eliminated. As a result of this, the shape the workpiece has after removal from the holder deviates from the shape the workpiece has after it was machined by the tool and before it was removed from the holder. An inaccuracy in the workpiece shape arises in this manner which is greater in proportion as the elastic deformation of the workpiece caused by the clamping forces of the fasteners is greater, and in particular in proportion as the mechanical stiffness of the workpiece is smaller. This inaccuracy is inadmissible in particular when the drum-shaped workpiece has a comparatively great diameter and a comparatively small wall thickness while high requirements are imposed on the dimensional accuracy of the workpiece, for example, on the roundness.

SUMMARY OF THE INVENTION

It is an object of the invention to provide a method of machining a drum-shaped workpiece of the kind mentioned in the opening paragraph whereby the fastening of the drum-shaped workpiece to the machine tool holder causes the smallest possible elastic deformation of the workpiece, so that a dimensional accuracy of the drum-shaped workpiece achieved after machining is influenced as little as possible by the removal of the workpiece from the holder.

According to the invention, the method of machining a drum-shaped workpiece is for this purpose characterized in that the workpiece is provided with a support surfaces directed substantially parallel to the centerline and are fastened to the holder by means of an adhesive which is provided exclusively between the support surface and the holder, the workpiece being brought into connection with the holder exclusively by way of the adhesive. Since the drum-shaped workpiece is fastened to the holder exclusively via the adhesive, the workpiece is held in position relative to the holder exclusively by means of adhesion forces between the workpiece and the adhesive and adhesion forces between the adhesive and the holder during machining. A pretensioning force which is necessary for obtaining a clamping force on the workpiece in the case of the known, usual fasteners described above, and a deformation of the drum-shaped workpiece resulting from the pretensioning force are prevented thereby, so that the workpiece fastened to the holder in this manner suffers the smallest possible deformation. Since furthermore the support surface of the workpiece is provided parallel to the centerline of the workpiece, it is achieved that mechanical shear stresses in the adhesive are introduced into the drum-shaped workpiece in a direction parallel to the centerline, i.e. in a direction in which the mechanical stiffness of the workpiece is comparatively great. Stresses in the drum-shaped workpiece in a direction perpendicular to the centerline, i.e. in a direction in which the mechanical stiffness of the workpiece is comparatively small, are prevented as much as possible in this manner. The fact that the drum-shaped workpiece is fastened to the holder exclusively via the adhesive moreover achieves that mechanical vibrations of the workpiece arising during machining under the influence of machining forces of varying intensity exerted by the tool on the workpiece are damped by the adhesive and detract as little as possible from the dimensional accuracy of the workpiece to be manufactured.

A special embodiment of a method according to the invention for machining a drum-shaped workpiece is characterized in that the adhesive comprises rosin and beeswax. Said adhesive has a comparatively high tensile strength and a comparatively high viscosity. The area required for the support surface of the workpiece is comparatively small thanks to this favorable combination of tensile strength and viscosity. In addition, mechanical shear stresses present in the adhesive are distributed uniformly in the adhesive and introduced into the workpiece through the support surfaces; so that mechanical stress concentrations in the workpiece are prevented as much as possible.

A further embodiment of a method according to the invention for machining a drum-shaped workpiece is characterized in that the drum-shaped workpiece is provided with support surfaces directed substantially parallel to the centerline adjacent a first and adjacent a second end. A stiff and stable support is thus provided for the drum-shaped workpiece, while the support surfaces are readily accessible for applying the adhesive during fastening of the workpiece to the holder.

A yet further embodiment of a method according to the invention for machining a drum-shaped workpiece is characterized in that the support surfaces are circular-cylindrical and concentric relative to the centerline. By using the circular-cylindrical support surface which is concentric relative to the centerline, the drum-shaped workpieces supported uniformly in circumferential direction, and mechanical shear stresses present in the adhesive are uniformly introduced into the workpiece seen in circumferential direction.

A special embodiment of a method according to the invention for machining a drum-shaped workpiece is characterized in that the support surfaces are provided on an inner wall of the drum-shaped workpiece. A comparatively large support surface area is achieved in this manner, so that mechanical loads transmitted from the holder through the adhesive to the workpiece are introduced into the workpiece through a comparatively large surface area, and thus cause comparatively low mechanical stresses in the workpiece.

A further embodiment of a method according to the invention for machining a drum-shaped workpiece is characterized in that the adhesive is provided between the support surfaces of the workpiece and support surfaces of the holder which are circular-cylindrical and concentric relative to the axis of rotation and which is provided along a circumference of disc shaped supports of the holder which extends perpendicularly to the axis of rotation. The use of the disc-shaped supports causes a particularly stable and stiff supporting action on the drum-shaped workpiece in circumferential direction.

A still further embodiment of a method according to the invention for machining a drum-shaped workpiece is characterized in that the support surfaces of the workpiece and the support surfaces of the holder have a length, seen parallel to the centerline and the axis of rotation, which is smaller than a difference between a radius of curvature of the support surfaces of the workpiece and a radius of curvature of the support surfaces of the holder. The adhesive is applied in molten form between the support surfaces of the workpiece and the holder, the temperature of the adhesive lying above the melting point of the adhesive. The adhesive shrinks when it subsequently cools down. In this further embodiment of the method it was found that the shrinkage of the adhesive in a direction parallel to the centerline and the axis of rotation is considerably greater than in a direction perpendicular to the centerline and the axis of rotation. Shrinkage stresses in the adhesive thus occur mainly in a direction parallel to the centerline of the workpiece. Such shrinkage forces are introduced into the workpiece through the support surfaces of the workpiece in a direction parallel to the centerline and lead only to negligible deformations of the workpiece. Shrinkage forces perpendicular to the support surface of the workpiece, which deform the workpiece more strongly, are thus prevented as much as possible.

A special embodiment of a method according to the invention for machining a drum-shaped workpiece is characterized in that the support of the holder has a coupling member whereby the holder can be coupled to a coupling member of the machine tool which is rotatable about the axis of rotation and which has a position relative to the support which is adjustable in a direction perpendicular to the axis of rotation, the workpiece centerline being aligned with the axis of rotation of the machine tool through adjustment of the position of the coupling member of the support. The workpiece centerline is aligned with the axis of rotation of the machine tool in a simple and effective manner through the use of this coupling member.

A further embodiment of a method according to the invention for machining a drum-shaped workpiece, whereby the position of the coupling member of the support is adjusted in a practical and effective manner, is characterized in that the coupling member is fastened to the support by means of an elastic ball joint, and the support is provided with setscrews bearing on the coupling member, the position of the coupling member being adjusted through adjustment of said setscrews.

A yet further embodiment of a method according to the invention for machining a drum-shaped workpiece, whereby the drum-shaped workpiece is provided with a circular-cylindrical support surface which is concentric with the centerline both adjacent a first and adjacent a second end, is characterized in that the holder is provided with two disc-shaped supports which extend perpendicularly to the axis of rotation and which are each provided along a circumference with a circular-cylindrical support surface which is concentric relative to the axis of rotation. The two support surfaces of the drum-shaped workpiece are each fastened to an individual disc-shaped support by means of the adhesive in this further embodiment of the method, so that the drum-shaped workpiece and the two disc-shaped supports together form a particularly stiff, closed tubular construction and the workpiece can be machined in a particularly accurate manner.

A special embodiment of a method according to the invention for machining a drum-shaped workpiece is characterized in that the disc-shaped supports are interconnected by means of a rod which extends parallel to the axis of rotation, at least one of the supports being detachably coupled to said rod. The workpiece can be fastened to the holder in a simple and practical manner because one of the disc-shaped supports is detachably coupled to the rod.

An X-ray diagnosis apparatus of the kind mentioned in the opening paragraph is known from EP-A-0 456 322. In the known X-ray diagnosis apparatus, the object is a patient who is placed between the X-ray source and the drum-shaped carrier with the X-ray-sensitive transducer. The X-ray-sensitive transducer is, for example, a selenium layer provided on an outer wall of the carrier. For making an X-ray picture, the selenium layer is electrically charged by a charging member arranged adjacent the carrier. When the patient is subsequently irradiated with an X-ray beam, the electric charge disappears in locations of the selenium layer reached by the X-rays, whereas the electric charge remains in locations of the selenium layer not reached by the X-rays. A pattern of electric charges is thus formed on the selenium layer which corresponds to a pattern of X-ray transmitting and X-ray absorbing tissues present in the patient. The carrier is then rotated about the axis of rotation, during which the pattern of electric charges passes the read-out unit and is read by the read-out unit. In the known X-ray diagnosis apparatus, the carrier does not rotate during irradiation of the patient, i.e. the pattern of electric charges is entirely formed simultaneously on the selenium layer. It is achieved thereby that the patient need be exposed to the X-ray beam for a comparatively short time only, while a major portion of the radiation emitted by the X-ray source is effectively used for forming the pattern of electric charges on the selenium layer. This renders it necessary for the drum-shaped carrier to have a comparatively great diameter, for example 0.5 m. Furthermore, the degree of roundness of the drum-shaped carrier must be comparatively high, for example 15 μm, because the read-out unit must have a distance to the rotating carrier which is accurately defined and lies within very narrow tolerance limits in order to obtain a high contrast of the X-ray picture. When the drum-shaped carrier of the selenium layer is manufactured by the method according to the invention, said roundness is achieved in a drum-shaped carrier of said diameter, so that the method according to the invention is eminently suitable for manufacturing such drum-shaped carriers.

A photocopier of the kind mentioned in the opening paragraph is known from DE-A-25 06 684. In the known photocopier, the original is exposed by means of the light source and the light reflected by the original is focused by a system of lenses onto the photosensitive transducer provided on the drum-shaped carrier. The photosensitive transducer is, for example, a selenium layer provided on an outer wall of the carrier and electrically charged prior to the exposure of the original by an electrical charging member arranged adjacent the carrier. The electric charge disappears in locations of the selenium layer illuminated by the light reflected by the original and remains in locations of the selenium layer not illuminated by light reflected by the original. A pattern of electric charges is thus formed on the selenium layer corresponding to a pattern of light-reflecting and light-absorbing regions present on the original, for example, a written or printed text. The carrier is subsequently rotated about the axis of rotation, whereby the pattern of electric charges passes the feed unit for the supply of toner arranged adjacent the carrier. Toner particles are thus electrically attracted by the portions of the selenium layer which are electrically charged, so that a pattern of toner particles is created on the selenium layer corresponding to the pattern of electric charges on the selenium layer. The carrier is subsequently rotated further about the axis of rotation, whereby the pattern of toner particles passes the printing member. The printing member of the known photocopier is a roller member which bears with pretension on the drum-shaped carrier and forms part of a transport device for the copies, the pattern of toner particles being imprinted on a copy to be transported between the carrier and the roller member. The degree of roundness of the drum-shaped carrier must be comparatively high because said system of lenses must have a distance to the rotating carrier which is accurately defined and lies within very narrow tolerance limits in order to obtain a sharp copy. Furthermore, the toner feed unit must also have a distance to the rotating carrier which lies within very narrow tolerance limits in order to obtain a constant contrast. Since a drum-shaped workpiece manufactured by the method according to the invention has a very accurate roundness, the method according to the invention is eminently suitable for manufacturing a drum-shaped carrier of such a photocopier.

BRIEF DESCRIPTION OF THE DRAWINGS

The invention will be explained in more detail below with reference to the drawing, in which.

DETAILED DESCRIPTION OF THE PREFERRED EMBODIMENTS

Figure 1:
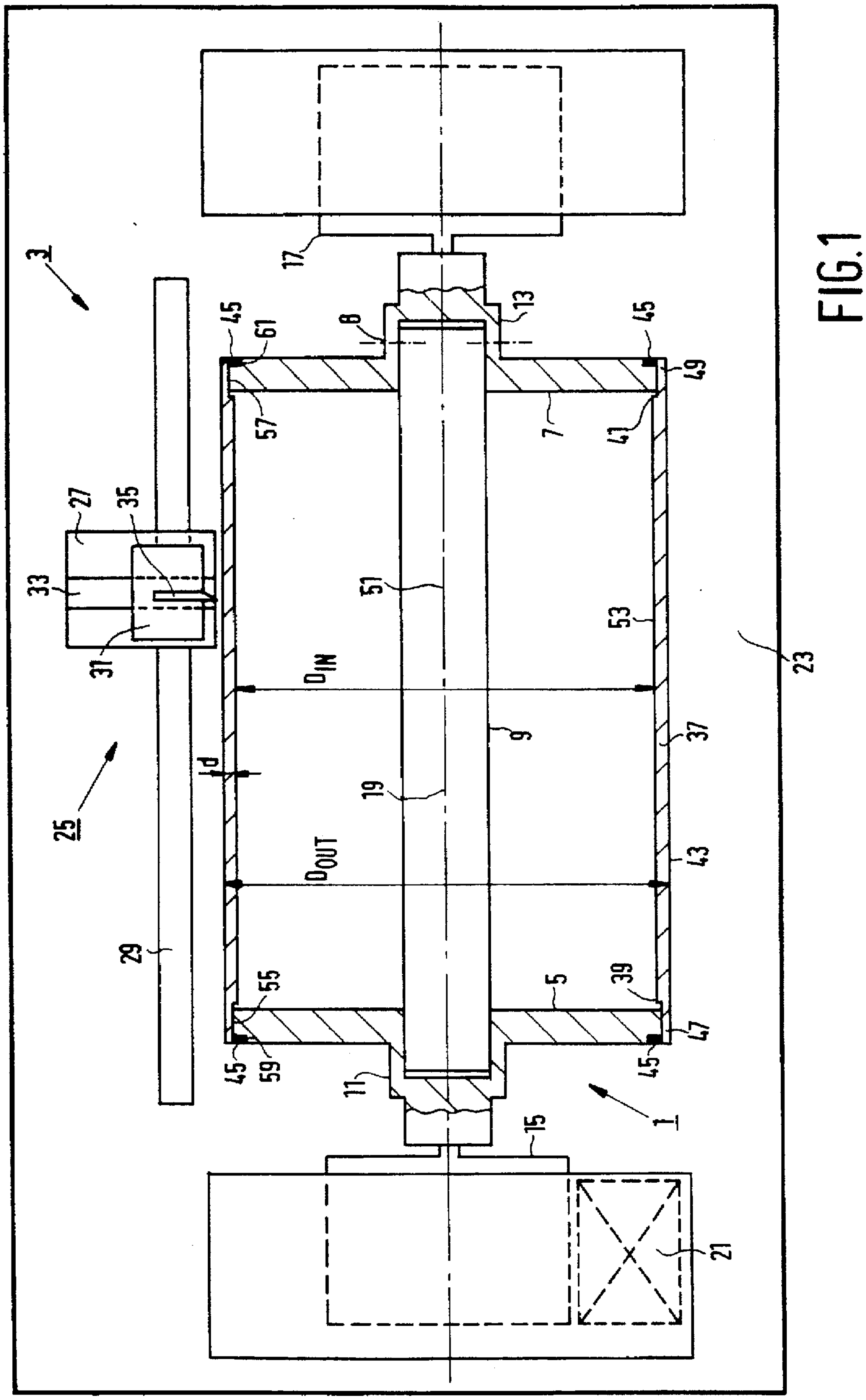
FIG. 1 shows a drum-shaped workpiece fastened to a machine tool holder for carrying out a method according to the invention.
Figure 2:
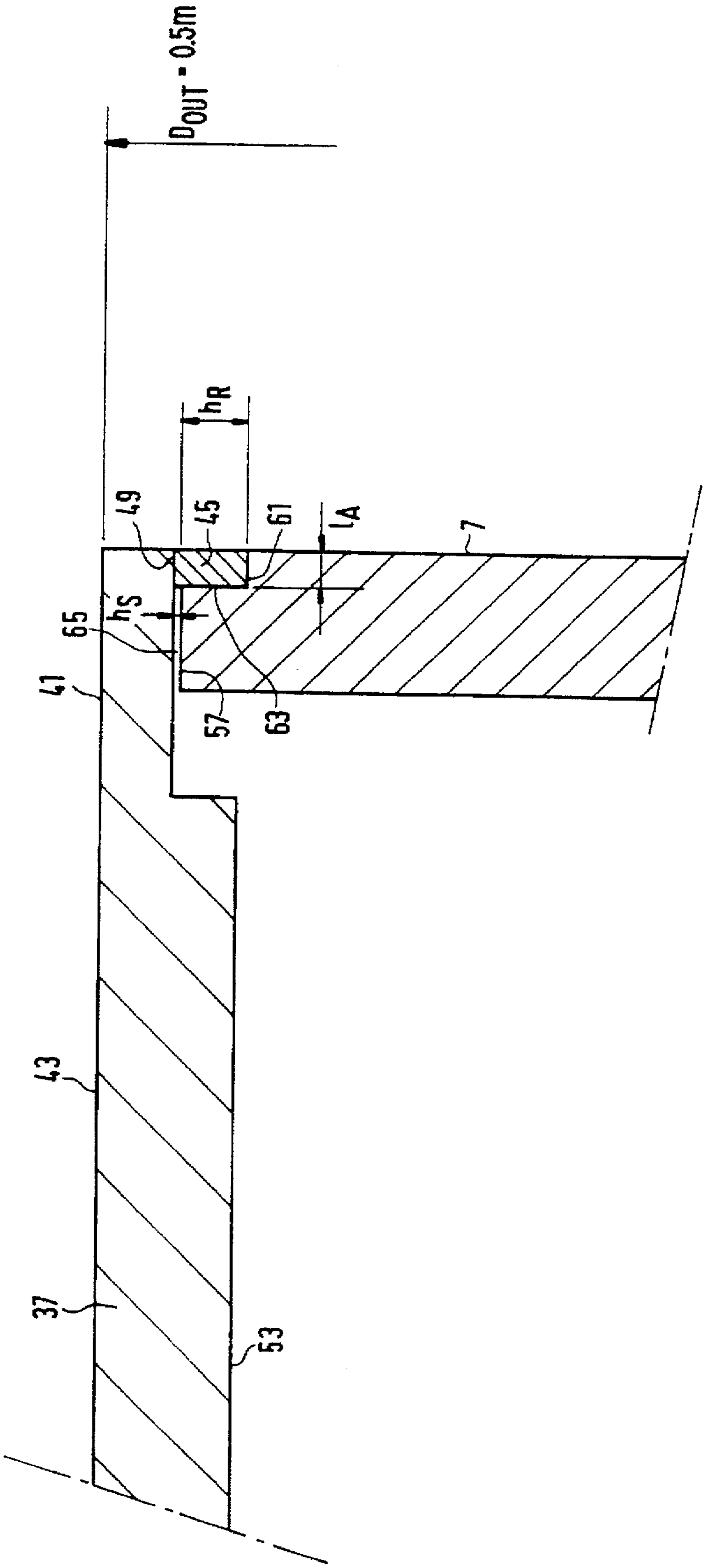
FIG. 2 shows in detail a fastening of the drum-shaped workpiece to the holder of FIG. 1.
Figure 3:
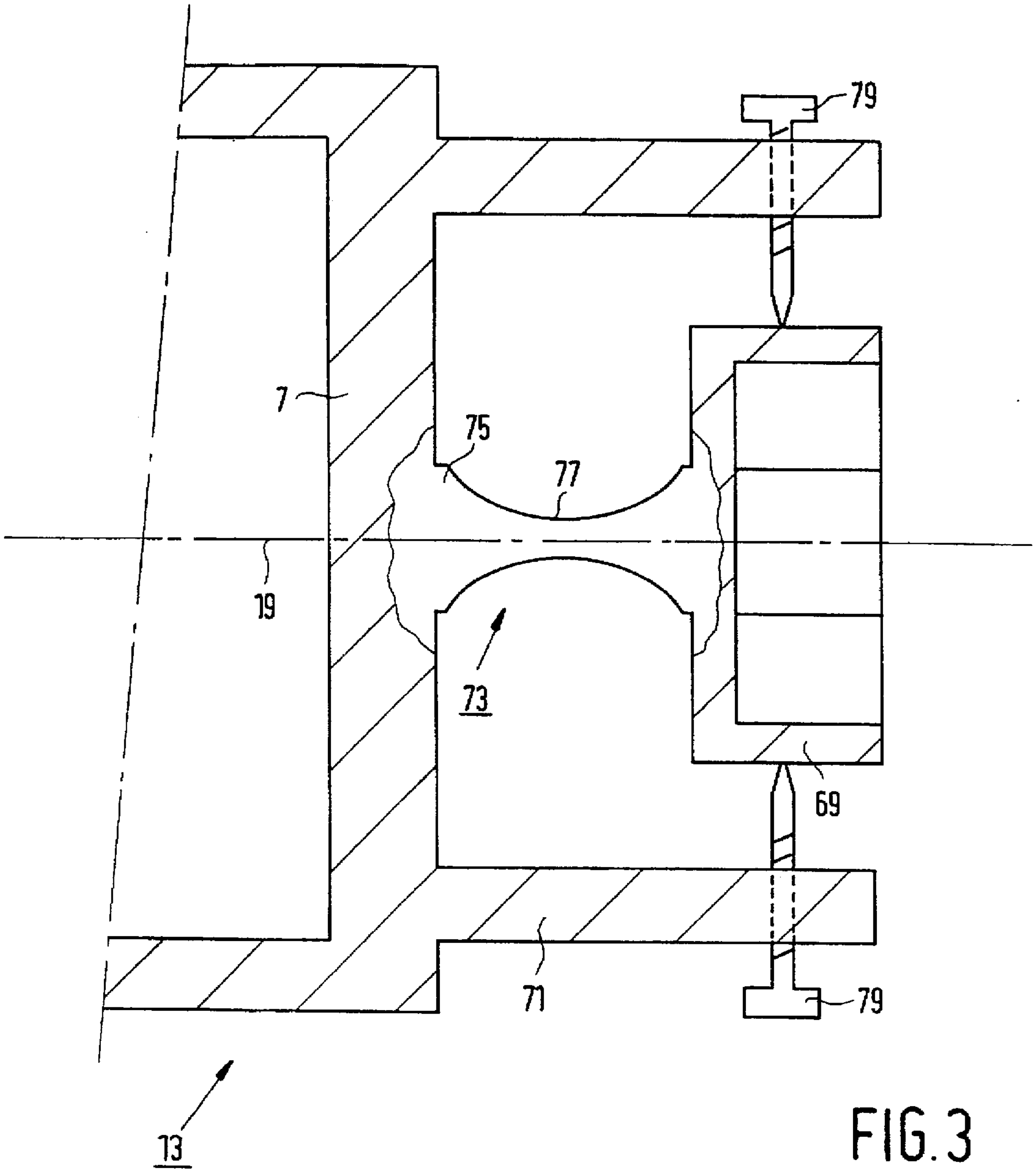
FIG. 3 shows in detail a coupling member with which the holder of FIG. 1 can be coupled to a coupling member of the machine tool.

As FIGS. 1 to 3 show, a holder 1 of a machine tool 3 for carrying out a method according to the invention comprises a first metal disc-shaped support 5 and a second metal disc-shaped support 7 which are interconnected by a metal rod 9. The first support 5 is permanently fixed to the rod 9, whereas the second support 7 is detachably fastened to the rod 9 by means of a bolt connection 8 shown diagrammatically only in FIG. 1. The supports 5 and 7 are provided adjacent their respective central portions with adjustable coupling members 11 and 13 which are to be described in more detail below and with which the holder 1 can be coupled to a first rotatable coupling member 15 and a second rotatable coupling member 17, respectively, of the machine tool 3. The coupling members 15 and 17 define a horizontal axis of rotation 19 of the machine tool 3 which is shown diagrammatically only in FIG. 1. The coupling member 15 can be driven into rotation by an electric drive motor 21 of the machine tool 3, while the coupling member 17 is journalled so as to be freely rotatable relative to a frame 23 of the machine tool 3. As FIG. 1 shows, the machine tool 3 further comprises a positioning device 25 with a longitudinal slide 27 which is displaceable relative to the frame 23 along a straight guide 29 of the frame 23 directed parallel to the axis of rotation 19, and a transverse slide 31 which is displaceable relative to the longitudinal slide 27 along a straight guide 33 of the longitudinal slide 27 directed perpendicular to the axis of rotation 19. A tool, such as, for example a cutting tool 35, is fastened to the transverse slide 31 and is thus displaceable in directions parallel to and perpendicular to the axis of rotation 19 by means of the positioning device 25.

As FIG. 1 shows, the disc-shaped supports 5 and 7 of the holder 1 extend perpendicularly to the axis of rotation 19, while the rod 9 of the holder 1 extends parallel to the axis of rotation 19. A drum-shaped, circular-cylindrical workpiece 37 can be fastened to the holder 1 of the machine tool 3. A first end 39 of the drum-shaped workpiece 37 is fastened around the first support 5 in a manner yet to be described in more detail, while a second end 41 of the drum-shaped workpiece 37 is fastened around the second support 7. The ends 39 and 41 of the workpiece 37 for this purpose have an internal diameter greater than an external diameter of the disc-shaped supports 5 and 7. The drum-shaped workpiece 37 has a comparatively great outer diameter Dour and a comparatively small wall thickness $d=(D_{OUT}-D_{IN})/2$, for example, an outer diameter $D_{OUT}=0.5$ m and a wall thickness d=10 mm. The drum-shaped workpiece 37 preferably has already been preprocessed in a manner usual and known per se, whereby the outer diameter $D_{OUT}$ of the workpiece 37 has been brought to within a predetermined tolerance of, for example, 0.1 mm. An outer wall 43 of the drum-shaped workpiece 37 is given a finishing treatment in the method according to the invention by means of the machine tool 3 so that the outer diameter $D_{OUT}$ of the drum-shaped workpiece 37 and the roundness of the outer wall 43 of the workpiece 37 are brought to within very narrow tolerance limits of, for example, 10 μm, while the outer wall 43 of the workpiece 37 is also given a desired high smoothness with an Ra value of, for example, 0.03 μm or smaller. A few application possibilities for such an accurately manufactured drum-shaped workpiece 37 will be discussed below with reference to a few examples.

In the method according to the invention, the drum-shaped workpiece 37 is fastened to the holder 1 by means of an adhesive 45 which is provided between the first end 39 of the workpiece 37 and the first support 5, and between the second end 41 of the workpiece 37 and the second support 7. As FIG. 1 shows, the drum-shaped workpiece 37 is for this purpose provided with a first support surface 47 adjacent the first end 39 and with a second support surface 49 adjacent the second end 41, The support surfaces 47 and 49 are a circular-cylindrical and are concentric with a centerline 51 of the drum-shaped workpiece 37, which is substantially parallel to the centerline 51, and are provided on an inner wall 53 of the drum-shaped workpiece 37. The disc-shaped supports 5 and 7 of the holder 1 are also provided with respective circular-cylindrical support surfaces 59, 61 concentric with the axis of rotation 19 and adjacent an outer circumference 55, 57. FIG. 2 shows the relative positions of the second support surface 49 of the drum-shaped workpiece 37 and the support surface 61 of the second disc-shaped support 7 of the holder 1 in detail. The relative positions of the first support surface 47 of the workpiece 37 and the support surface 59 of the first support 5 are comparable thereto. As FIG. 2 shows, the support surface 61 of the support 7 forms a side wall of an annular chamber 63 which is arranged along the outer circumference 57 of the support 7. In the present example of the drum-shaped workpiece 37 with $D_{OUT}=0.5$ m, the annular chamber 63 has a height $h_R$ in radial direction of approximately 10 mm, and a length $l_A$ in axial direction of approximately 3 mm. A gap height $h_S$ of a gap 65 between the outer circumference 57 of the support 7 and the second support surface 49 of the workpiece 37 as shown in FIG. 2 is approximately 0.5 mm. As FIG. 2 shows, the adhesive 45 is provided in the annular chamber 63 between the second support surface 49 of the workpiece 37 and the support surface 61 of the support 7. A mixture of rosin and beeswax is used as the adhesive, having a melting temperature of approximately 120° C.

Figure 4A:
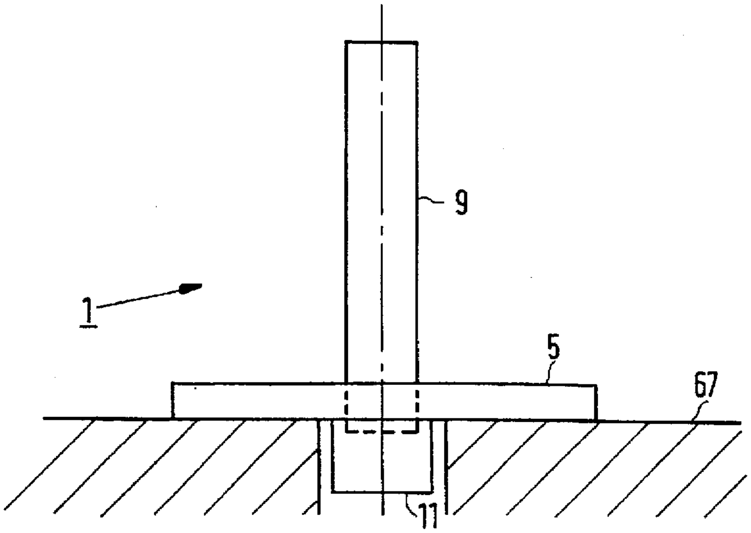
FIGS. 4*a* to 4*c* show a few stages in the fastening process of the drum-shaped workpiece to the holder of FIG. 1, FIG. 5 diagrammatically shows an X-ray diagnosis apparatus provided with a drum-shaped carrier manufactured by a method according to the invention, and FIG. 6 diagrammatically shows a photocopier provided with a drum-shaped carrier manufactured by a method according to the invention.
Figure 4B:
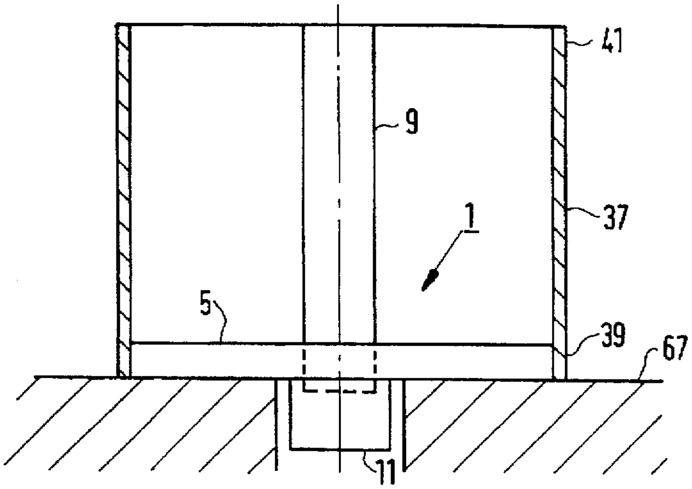
Figure 4C:
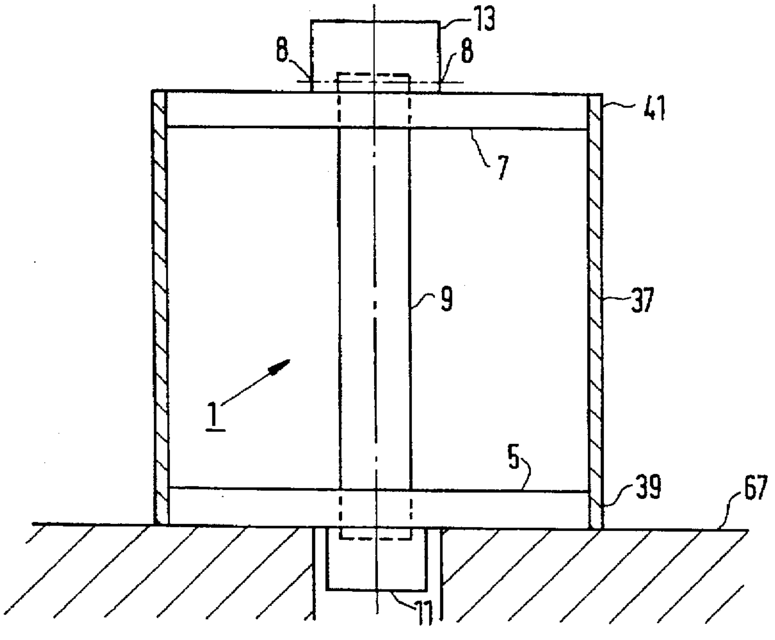

For the purpose of fastening the workpiece 37 to the holder 1, as shown in FIG. 4*a*, the second support 7 is first detached from the rod 9, and the rod 9 is placed in a vertical position with the first support 5 resting on a flat base 67. As FIG. 4*b* shows, the drum-shaped workpiece 37 to be machined is subsequently placed on the base 67 with its first end 39 over the rod 9 and the first support 5, after which the second support 7 is fastened to the rod 9 with bolt connection 8 as shown in FIG. 4*c*. In this vertical position of the holder 1 and the workpiece 37, the molten adhesive is subsequently provided in the annular chamber 63 shown in FIG. 2 between the second support 7 and the second support surface 49 of the workpiece 37. After the adhesive between the second support 7 and the second support surface 49 of the workpiece 37 has cured, the holder 1 with the workpiece 37 is turned upside down and the second support 7 is placed on the base 67. Now the annular chamber 63 between the first support 5 and the first support surface 47 of the workpiece 37 is filled with the molten adhesive. After the adhesive between the first support 5 and the first support surface 47 of the workpiece 37 has also cured, the holder 1 with the workpiece 37 is placed between the coupling members 15 and 17 of the machine tool 3.

As FIG. 2 shows, the viscosity of the adhesive 45 used, comprising rosin and beeswax, is such that the molten adhesive 45 does not penetrate the gap 65 between the outer circumference 55 of the supports 5, 7 and the support surfaces 47, 49 of the drum-shaped workpiece 37 during application. The workpiece 37 is thus connected to the holder 1 by way of the adhesive 45 only, this adhesive 45 being exclusively provided between the first support surface 47 of the workpiece 37 and the support surface 59 of the first support 5, and between the second support surface 49 of the workpiece 37 and the support surface 61 of the second support 7. After its application, the adhesive 45 cools down, so that it shrinks. It was found that the adhesive 45 used shrinks mainly in a direction parallel to the centerline 51 of the workpiece 37 during cooling-down, and that the shrinkage of the adhesive 45 used is comparatively small in a direction perpendicular to the centerline 51 of the workpiece 37 if, as in the present example, the length $l_A$ of the support surfaces 59, 61 of the supports 5, 7 seen parallel to the axis of rotation 19 is smaller than the height $h_R$ of the annular chamber 63 seen perpendicular to the axis of rotation 19, which height $h_R$, given a comparatively small gap height $h_S$ of the gap 65 between the outer circumferences 55, 57 of the supports 5, 7 and the support surfaces 47, 49 of the drum-shaped workpiece 37, is approximately equal to half the difference between the inner diameter of the support surfaces 47, 49 of the workpiece 37 and an outer diameter of the support surfaces 59, 61 of the supports 5, 7. Owing to the comparatively small shrinkage of the adhesive 45 in a direction perpendicular to the centerline 51, shrinkage stresses in the adhesive 45 occur mainly in a direction parallel to the centerline 51. The shrinkage stresses occurring in the adhesive 45 parallel to the centerline 51 are introduced via the support surfaces 47, 49 of the workpiece 37 into the workpiece 37 in a direction parallel to the centerline 51, i.e. in a direction in which the drum-shaped workpiece 37 is comparatively stiff, and accordingly lead to only negligible deformations of the workpiece 37.

The coupling member 13 of the second support 7, by which the second support 7 can be coupled to the second coupling member 17 of the machine tool 3, is shown in detail in FIG. 3. The coupling member 11 of the first support 5 corresponds to the coupling member 13 of the second support 7 and is not shown in detail in the Figures. As FIG. 3 shows, the coupling member 13 of the support 7 comprises a coupling bush 69 which can be coupled substantially without play to the second coupling member 17 of the machine tool 3, whereby the freely rotatable second coupling member 17 of the machine tool 3 is taken along in rotation by the coupling member 13 of the support 7. The coupling bush 69 is arranged in a circular-cylindrical rim 71 of the coupling member 13 which is concentric with the axis of rotation, and is connected, to the support 7 via an elastic ball joint 73 which is known per se and usual and which has a shaft 75 with a reduced portion 77 directed parallel the axis of rotation 19. The coupling bush 69 is thus displaceable in directions perpendicular to the axis of rotation 19 over small distances relative to the support 7 under elastic deformation of the ball joint 73. As FIG. 3 further shows, a first pair of diametrically opposed setscrews 79 has been screwed into the rim 71. A second pair of setscrews, screwed into the rim 71 in a direction perpendicular to the setscrews 79 and also in mutual diametrical opposition, is not visible in FIG. 3. The the first pair of setscrews 79 and the second pair of setscrews bear on the coupling bush 69 so that a position occupied by the coupling bush 69 in a diction perpendicular to the axis of rotation 19 relative to the support 7 is adjustable through adjustment of the first and second pairs of setscrews. After the holder 1 with the workpiece 37 has been placed between the coupling members 15 and 17 of the machine tool 3, the centerline 51 of the workpiece 37 is brought into line with the axis of rotation 19 of the machine tool 3 through adjustment of the positions of the coupling bushes 69 relative to the supports 5 and 7 by means of position measurements of the outer wall 43 of the workpiece 37 which are known per se and usual It was described in the above how the drum-shaped workpiece 37 is fastened to the holder 1 of the machine tool 3 exclusively by means of adhesive 45. The workpiece 37 is thus held in position relative to the holder 1 exclusively through adhesive forces between the workpiece 37 and the adhesive 45 and between the adhesive 45 and the holder 1. When the holder 1 with the workpiece 37 has been fastened to the coupling members 15 and 17 of the machine tool 3 such that the centerline 51 of the workpiece 37 extends in horizontal direction, mechanical stresses are present in the workpiece 37 which arise exclusively from the workpiece's 37 own weight and from the shrinkage stresses of the adhesive 45 which were discussed above and which are in themselves comparatively small. The mechanical stresses in the workpiece 37 are thus minimal, and accordingly the elastic deformation of the workpiece 37 under the influence of these mechanical stresses is also minimal. Since the support surfaces 47, 49 of the workpiece 37 and the support surface 59, 61 of the holder 1 extend parallel to the axis of rotation 19, compression stresses only arise in the adhesive 45 under the influence of the weight of the workpiece 37, and shear stresses between the adhesive 45 and the support surfaces 47, 49, 59, 61 are prevented. The workpiece 37 is uniformly supported, and the support surfaces 47, 49 of the workpiece 37 have a comparatively large area because the support surfaces 47, 49 of the workpiece 37 are provided on the inner wall 53 of the workpiece 37 and extend along the full inner circumference of the workpiece 37, while also the support surfaces 59, 61 of the supports 5, 7 extend along the full outer circumference 55, 57 of the supports 5, 7. Supporting forces exerted by the adhesive 45 on the workpiece 37 are thus distributed over a comparatively large surface area of the support surfaces 47, 49, so that the supporting forces lead to only comparatively low stresses in the workpiece 37.

The adhesive 45 used, which comprises a mixture of rosin and beeswax, has a comparatively great tensile strength and a comparatively high viscosity. Thanks to the comparatively high tensile strength of the adhesive 45, the admissible weight of the drum-shaped workpiece 37 to be manufactured by the method according to the invention is comparatively high. The comparatively high viscosity of the adhesive 45 achieves that mechanical stresses in the adhesive 45 are distributed uniformly through the adhesive 45 and are introduced uniformly into the workpiece 37. Mechanical stress concentrations and local deformations of the adhesive 45 and the workpiece 37 caused by these stress concentrations are prevented thereby.

Furthermore, the drum-shaped workpiece 37 with the two disc-shaped supports 5 and 7 supporting the workpiece 37 adjacent its two ends 39 and 41 forms a particularly stiff, closed tubular construction, so that the workpiece 37 is supported by the disc-shaped supports 5 and 7 in a particularly stable, stiff manner. It is achieved thereby that the workpiece 37 is deformed as little as possible under the influence of operational forces exerted by the cutting tool 35 of the workpiece 37 during machining by the cutting tool 35, so that the drum-shaped workpiece 37 can be processed in a particularly accurate manner.

It was discussed above that the fastening of the drum-shaped workpiece 37 to the disc-shaped supports 5 and 7 of the holder 1 of the machine tool 3 exclusively by means of an adhesive leads to minimal mechanical stresses in the workpiece 37 caused by the fastening and to a particularly high stiffness of the workpiece 37 thus fastened. The elastic deformations of the workpiece 37 caused by the fastening of the workpiece 37 to the holder 1 and by operational forces on the workpiece 37 are as small as possible in this way. It is achieved in this manner that a dimensional accuracy which the drum-shaped workpiece 37 has after the workpiece 37 has been machined by the cutting tool 35 is maintained to a high degree when the workpiece 37 is removed from the holder 1 after the operations through removal of the adhesive 45. In particular, a roundness of the outer wall 43 of the workpiece 37 achieved after machining, which is 10 μm or even better for an outer diameter of 0.5 m of the workpiece 37, is maintained after the removal of the workpiece 37 from the holder 1. Two practical applications of a drum-shaped workpiece manufactured by the method according to the invention, wherein the dimensional accuracy achieved by the method is used to particular advantage, will now be discussed below.

Figure 5:
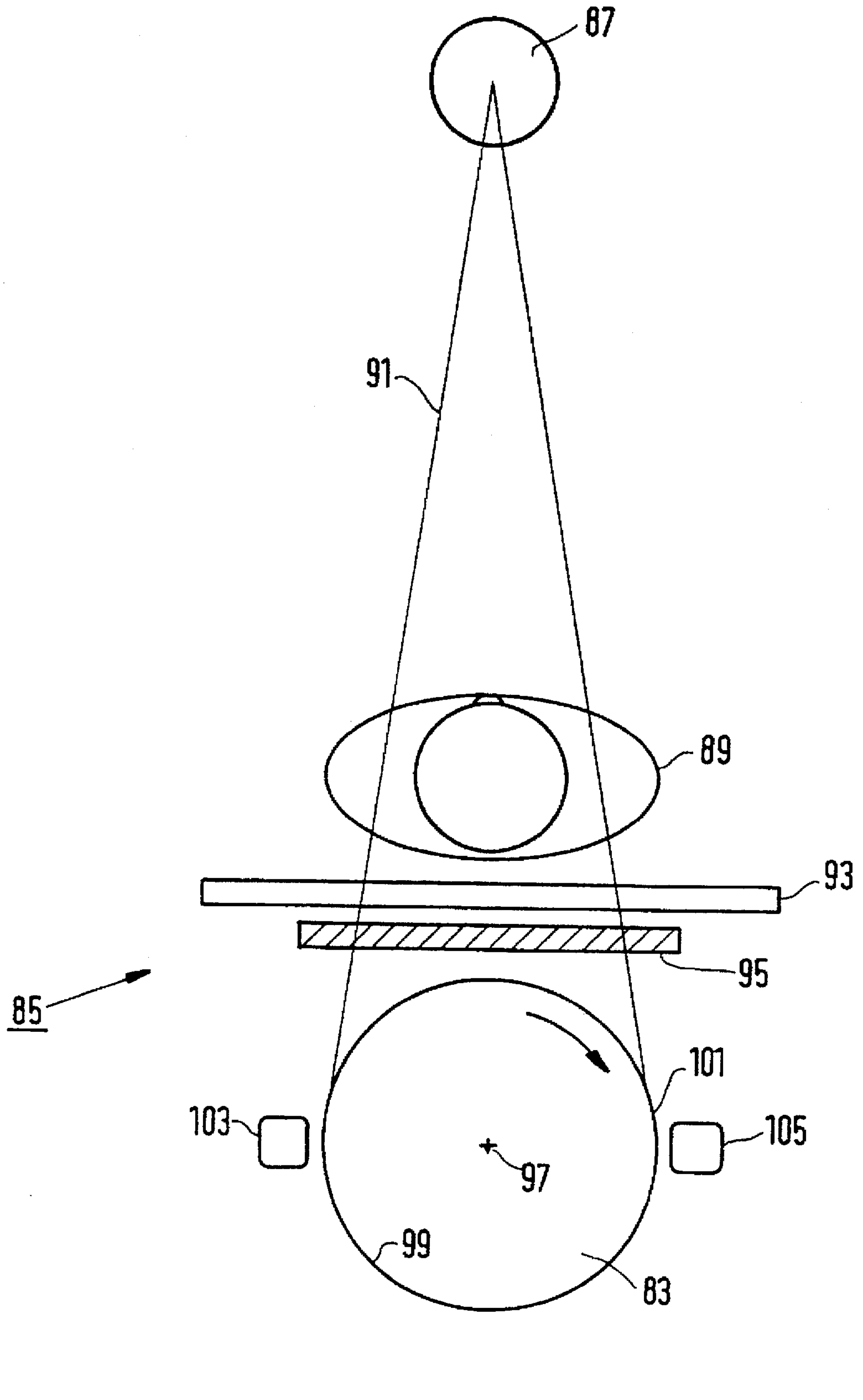

FIG. 5 diagrammatically shows a first application of a drum-shaped workpiece manufactured by the method according to the invention, where the drum-shaped workpiece forms part of a drum-shaped carrier 83 in an X-ray diagnosis apparatus 85 shown diagrammatically in FIG. 5. Such an X-ray diagnosis apparatus provided with a drum-shaped carrier manufactured in a conventional manner is known from EP-A-0 456 322. As FIG. 5 shows, the X-ray diagnosis apparatus 85 further comprises an X-ray source 87 by means of which an object, for example a patient 89 to be diagnosed, can be exposed to an X-ray beam 91. The patient 89 is for this purpose laid on a horizontal table 93 which is arranged between the X-ray source 87 and the drum-shaped carrier 83. Also present between the table 93 and the carrier 83 is a stray radiation raster 95, which is arranged parallel to the table 93. The drum-shaped carrier 83 is rotatable about an axis of rotation 97 directed parallel to the table 93 and can be driven by a drive unit not shown in FIG. 5. An X-ray-sensitive transducer is provided on an outer wall 99 of the carrier 83, for example, a selenium layer 101 with a thickness of approximately 0.5 mm. An electric charging member 103 and a read-out unit 105, both shown diagrammatically only in FIG. 5, are arranged around the carrier 83 outside the reach of the X-ray beam 91.

For making an X-ray picture of the patient 89, the carrier 83 with the selenium layer 101 is first rotated about the axis of rotation 97, such that the selenium layer 101 passes the charging member 103 and is electrically charged by the charging member 103. A voltage of approximately 1500 V is applied thereby between the outer wall 99 of the carrier 83 and the surface of the selenium layer 101. After the selenium layer 101 has been charged, the patient 89 is irradiated with the X-ray beam 91, while the carrier 83 is stationary. This causes the electric charge to disappear from the selenium layer 101 in locations where the selenium layer 101 is hit by X-rays, while the electric charge of the selenium layer 101 remains in locations where the selenium layer 101 is not hit by X-rays. The beam of X-rays 91 is thus converted into a pattern of electric charges on the selenium layer 101 corresponding to a pattern of X-ray-transmitting and X-ray-absorbing tissues present in the patient 89. After irradiation of the patient 89, the carrier 83 is rotated further so that the pattern of electric charges present on the selenium layer 101 passes the read-out unit 105 and is read out by the read-out unit. Construction and function of the charging member 103 and the read-out unit 105 are described in more detail in EP-A-0 219 897. The X-ray diagnosis apparatus 85 further comprises means, not shown in FIG. 5, for converting information read out by the read-out unit 105 into a picture which can be of use to the user of the X-ray diagnosis apparatus 85.

As was noted above, the carrier 83 with the selenium layer 101 is stationary during irradiation of the patient 89. The portion of the patient 89 to be diagnosed is irradiated in its entirety for a short time only, so that the pattern of electric charges is simultaneously formed in its entirety on the selenium layer 101 on the side of the carrier 83 facing the patient 89. The time during which the patient 89 is to be exposed to X-rays, which are detrimental, is thus comparatively short. The drum-shaped carrier 83, however, must have a comparatively large outer diameter because the pattern of electric charges must be formed in its entirety on one half of the carrier 83. In the present example, the outer diameter of the drum-shaped carrier 83 is approximately 0.5 m. Furthermore, the distance from the read-out unit 105 to the selenium layer 101 must be accurate to within 10 to 20 μm during reading-out of the pattern of electric charges, for which the carrier 83 rotates with its selenium layer 101 along the read-out unit 105, if a high and constant sharpness and a good contrast of the X-ray picture are to be obtained. This means that the drum-shaped carrier 83 must have a roundness of 10 μm or better. Finally, the smoothness of the outer wall 99 of the carrier 83 must have an Ra value of 0.03 82 m or smaller in order to obtain a smooth and uniform selenium layer 101. Said accuracies which the drum-shaped carrier 83 must necessarily have for said application in the X-ray diagnosis apparatus 85 are satisfactorily provided in that the drum-shaped carrier 83 is manufactured by the method according to the invention.

Figure 6:
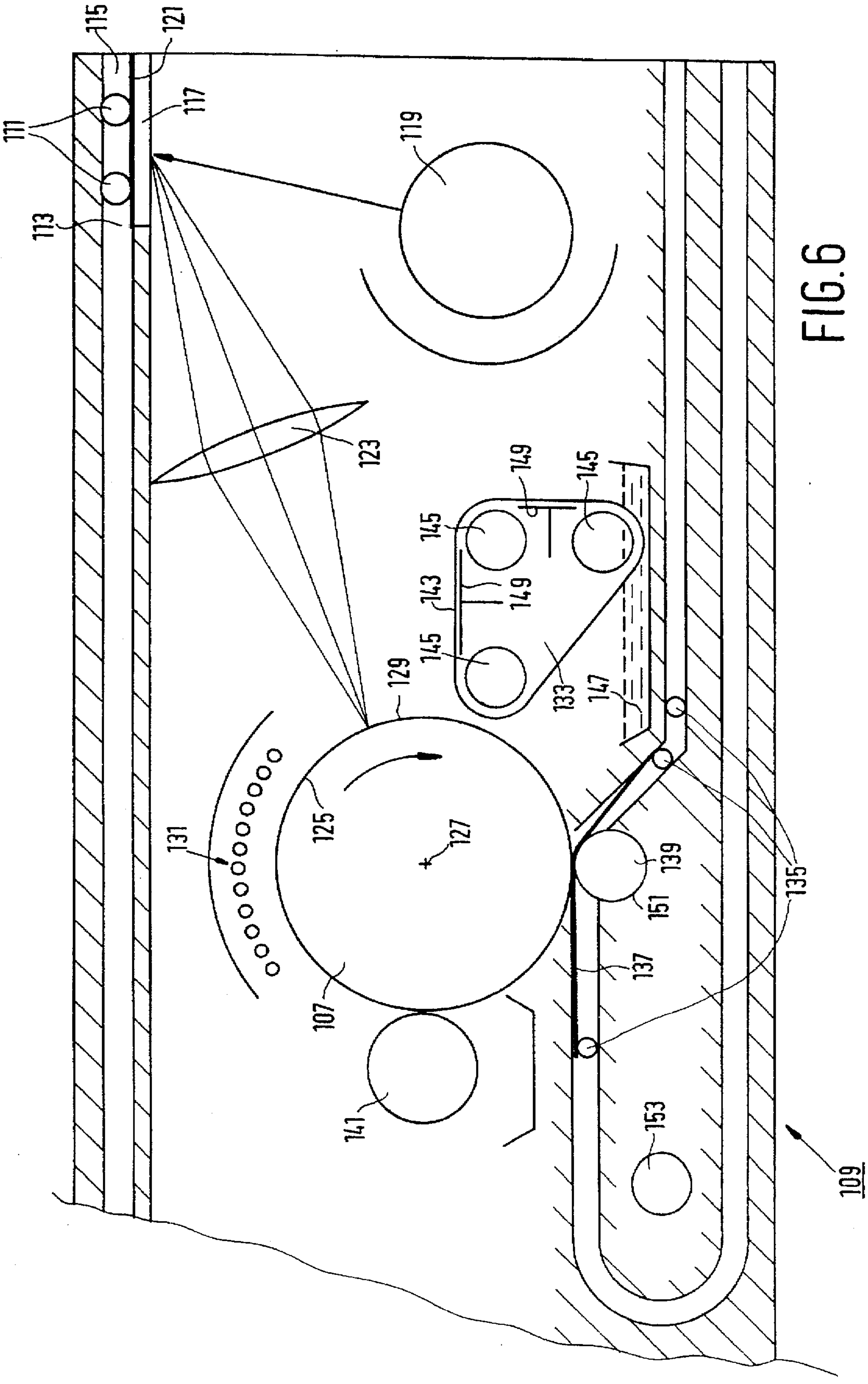

FIG. 6 diagrammatically shows a second application of a drum-shaped workpiece manufactured by the method according to the invention where the drum-shaped workpiece forms part of a drum-shaped carrier 107 in a photocopier 109. Such a photocopier, which is provided with a drum-shaped carrier manufactured in a conventional manner, is known from DE-A-25 06 684. As FIG. 6 shows, the photocopier 109 further comprises a first transport unit 111 for introducing an original 113 to be copied into an exposure space 115 which is bounded at one side by a transparent plate 117. The photocopier 109 further comprises a light source 119 by which a side 121 of the original 113 facing the transparent plate 117 can be illuminated. Between the transparent plate 117 and the drum-shaped carrier 107 there is a system of lenses 123 by which light reflected by the original 113 during exposure is focused onto a surface 125 of the drum-shaped carrier 107. The carrier 107 is rotatable about an axis of rotation 127 directed parallel to the transparent plate 117 and can be driven by a drive unit not shown in FIG. 7. A photosensitive transducer is applied on the surface 125 of the carrier 107, for example, a selenium layer 129. As is diagrammatically depicted in FIG. 6, an electric charging member 131, a feed unit 133 for the supply of toner to the selenium layer 129 present on the carrier 107, a second transport unit 135 for introducing a copy 137 to be manufactured, a printing member 139, and a cleaning unit 141 are also present around the carrier 107 outside the range of the light reflected by the original 113.

For making the copy 137, the carrier 107 with the selenium layer 129 is first rotated about the axis of rotation 127 such that the selenium layer 129 passes the charging member 131 and is provided with a positive electric charge by this charging member 131. After charging of the selenium layer 129, the original 113 is exposed by means of the light source 119. During this, the electric charge disappears from the selenium layer 129 in locations where the selenium layer 129 is illuminated by the light reflected by the original, and the electric charge of the selenium layer 129 remains in locations where the selenium layer 129 is not illuminated by the reflected light. The light reflected by the original 113 is thus converted into a pattern of positive electric charges on the selenium layer 129 corresponding to a pattern of light-reflecting and light-absorbing portions on the side 121 of the original 113 such as, for example, a written or printed text. After the exposure of the original 113, the carrier 107 is rotated further so that the pattern of positive electric charges present on the selenium layer 129 passes the toner feed unit 133. As is diagrammatically shown in FIG. 6, the feed unit 133 comprises a transport belt 143 which is guided over a number of metal rollers 145 and traverses a reservoir of toner particles 147. Such toner particles have the property that they are attracted by a positive electric charge. A metal plate 149 extends parallel to the transport belt 143 between each pair of adjoining rollers 145. The metal rollers 145 and plates 149 have a positive electric charge, so that the toner particles are carried along by the transport belt 143 when the transport belt 143 traverses the reservoir of toner particles 147. The positive electric charges on the selenium layer 129 are greater than the positive charge of the rollers 145 and the plates 149 of the feed unit 133 to such an extent that the toner particles upon passing the selenium layer 129 are attracted by the positive electric charges on the selenium layer 129. A pattern of toner particles corresponding to the pattern of positive charges on the selenium layer 129 thus arises on this selenium layer 129. When the carrier 107 is rotated further, the selenium layer 129 with the pattern of toner particles now passes the printing unit 139 which comprises a metal roller 151. The metal roller 151 also has a positive electric charge and bears with pretension on the drum-shaped carrier 107. The copy 137 to be manufactured is introduced by the second transport unit 135 and passed between the carrier 107 and the roller 151, whereby the pattern of toner particles present on the selenium layer 129 is imprinted on the copy 137. The copy 137 is subsequently passed along a heater element 153 by the second transport unit 135, so that the toner particles imprinted on the copy 137 are burnt in into the copy 137. Upon further rotation of the carrier 107, finally, the selenium layer 129 passes the cleaning unit 141, where any toner particles still present on the selenium layer 129 are removed, so that the selenium layer 129 is made ready for making a next copy.

In the photocopier 109 described above, the required outer diameter of the drum-shaped carrier 107 is determined by the format of the original 113 and of the copy 137 to be made. A usual value for said outer diameter is, for example, 0.2 m or greater. To obtain a constant sharpness and a good contrast of the copy 137, furthermore, the distance between the selenium layer 129 and the system of lenses 123 and the distance between the selenium layer 129 and the toner feed unit 133 must lie within comparatively narrow tolerance limits. Therefore, the drum-shaped carrier 107 of the photocopier 109 must, as must the drum-shaped carrier 83 of the X-ray diagnosis apparatus 85 described earlier, have a roundness which is very good in relation to the outer diameter of the carrier 107. In addition, the surface 125 of the carrier 107 must have a comparatively high smoothness for obtaining a smooth and uniform selenium layer 129, the Ra value of the surface 125 being, for example, 0.03 μm or lower. The accuracies mentioned which the drum-shaped carrier 107 for use in the photocopier 109 must have are satisfactorily provided, as in the case of the drum-shaped carrier 83 in the X-ray diagnosis apparatus 85, in that the drum-shaped carrier 107 is manufactured by the method according to the invention.

In the embodiment of a method according to the invention described above, a mixture of rosin and beeswax is used as the adhesive. It is noted that instead of said adhesive alternative adhesives may be used which have a favorable combination of tensile strength and viscosity, for example, an adhesive with beeswax and chalk, an adhesive comprising paraffin wax, or an adhesive with cellulose-tri-nonane carbonic acid and a few parts of polystyrene.

The drum-shaped workpiece 37 manufactured by the embodiment of the method according to the invention as described above is a cylindrical workpiece. The term cylindrical is here understood to mean that the workpiece 37 has substantially identical cross-sections perpendicular to the centerline 51 in each and every position on the centerline 51, while the term drum-shaped is understood to mean that said cross-sections are circular. It is noted that the method is also suitable for machining drum-shaped workpieces which are not cylindrical such as, for example, drum-shaped workpieces with a conical outer wall.

It is further noted that the workpiece 37 may be given a support surface of a shape different from the circular-cylindrical support surfaces 47, 49 which are concentric with the centerline 51. Instead of the support surfaces 47, 49, for example, the workpiece 37 may be given a rim of support surfaces extending parallel to the centerline 51, which rim extends along a ring Which is concentric with the centerline 51.

It is further noted that instead of the holder 1 with the disc-shaped supports 5 and 7, an alternative type of holder may be used for the workpiece 37. Instead of the disc-shaped supports 5 and 7, for example, supports may be used which are provided with spokes extending transversely to the axis of rotation 19. The holder 1 may also be, for example, a cylindrical holder provided with a number of annular support surfaces projecting above an outer wall of the cylindrical holder.

It is further noted that it is not only possible to machine an outer wall of a drum-shaped workpiece by a method according to the invention, as in the embodiment described above, but that also an inner wall of a drum-shaped workpiece can be machined. A holder suitable for this should then be used, for example, a holder with two annular supports which surround the workpiece, the adhesive being provided between an annular support surface provided along an inner circumference of each annular support and an annular support surface provided on an outer wall of the drum-shaped workpiece.

It should finally be noted that the method according to the invention can be used not only for machining operations, wherein the workpiece is treated with a metal-removing tool, but it may also be used for processes in which the workpiece is operated on by means of a tool which does not remove metal. An example which may be mentioned is a method in which the workpiece is processed by means of a laser.

We claim:

1. A method of machining a workpiece, by which method the workpiece is fastened to a holder of a machine tool, which holder is rotatable about an axis of rotation, a centerline about which the workpiece is circularly symmetric coinciding substantially with the axis of rotation, and the workpiece is subsequently machined by means of a tool which is displaced at least in a direction parallel to the axis of rotation by means of a positioning device of the machine tool, wherein the workpiece is provided with two axially spaced apart circular-cylindrical support surfaces, each directed substantially parallel to the centerline, and is fastened to the holder by means of an adhesive which is provided exclusively between each of the two circular-cylindrical support surfaces and the holder, the workpiece being brought into connection with the holder exclusively by way of the adhesive.

2. A method as claimed in claim 1, wherein the adhesive comprises rosin and beeswax.

3. A method as claimed in claim 1 wherein one of the two circular-cylindrical support surfaces is adjacent a first end of the workpiece and the other of the two circular-cylindrical support surfaces is adjacent a second end of the workpiece.

4. A method as claimed in claim 1, wherein the two circular-cylindrical support surfaces are concentric relative to the centerline.

5. A method as claimed in claim 4, wherein the workpiece has an inner wall on which each of the two circular-cylindrical support surfaces is provided.

6. A method of machining a workpiece, by which method the workpiece is fastened to a holder of a machine tool, which holder is rotatable about an axis of rotation, a centerline about which the workpiece is circularly symmetric coinciding substantially with the axis of rotation, and the workpiece is subsequently machined by means of a tool which is displaced at least in a direction parallel to the axis of rotation by means of a positioning device of the machine tool, wherein the workpiece is provided with a first circular-cylindrical support surface directed substantially parallel to the centerline and is fastened to the holder exclusively by means of an adhesive, which adhesive is provided between the first support surface and the holder, the workpiece being brought into connection with the holder exclusively by way of the adhesive, and wherein the adhesive is provided between the first support surface of the workpiece and a first support surface of the holder which is circular-cylindrical and concentric relative to the axis of rotation and which is provided along a circumference of a first disc-shaped support of the holder which extends perpendicularly to the axis of rotation.

7. A method as claimed in claim 6, wherein the first support surface of the workpiece and the first support surface of the holder have a length, seen parallel to the centerline and the axis of rotation, which is smaller than a difference between a radius of curvature of the first support surface of the workpiece and a radius of curvature of the first support surface of the holder.

8. A method as claimed in claim 6, wherein the support of the holder has a coupling member whereby the holder can be coupled to a coupling member of the machine tool which is rotatable about the axis of rotation and which has a position relative to the support which is adjustable in a direction perpendicular to the axis of rotation, the workpiece centerline being aligned with the axis of rotation of the machine tool through adjustment of the position of the coupling member of the support.

9. A method as claimed in claim 8, wherein the coupling member is fastened to the support by means of an elastic ball joint, and the support is provided with set screws bearing on the coupling member, the position of the coupling member being adjusted through adjustment of said set screws.

10. A method as claimed in claim 6, wherein the workpiece is also provided with a second circular-cylindrical support surface directed substantially parallel to the centerline, a second support surface of the holder is also provided along a circumference of a second disc-shaped support which extends perpendicularly to the axis of rotation, and the adhesive is also provided between the second circular-cylindrical support surface of the workpiece and the holder.

11. A method as claimed in claim 10, wherein the first and second disc-shaped supports are interconnected by means of a rod which extends parallel to the axis of rotation, at least one of the supports being detachably coupled to said rod.

12. A method of manufacturing an X-ray diagnosis apparatus provided with an X-ray source for irradiating an object with an X-ray beam, an X-ray-sensitive transducer for converting X-rays into a pattern of electric charges, and a read-out unit for reading-out the pattern of electric charges, the X-ray -sensitive transducer being provided on a carrier which is rotatable about a centerline of the carrier about which the carrier is circularly symmetric by means of a drive unit, wherein the carrier is machined by a method in which the carrier is fastened to a holder of a machine tool, which holder is rotatable about said axis of rotation coinciding substantially with the centerline, and the workpiece is subsequently machined by means of a tool which is displaced at least in a direction parallel to the axis of rotation by means of a positioning device of the machine tool, wherein the carrier is provided with two axially spaced apart circular-cylindrical support surfaces, each directed substantially parallel to the centerline, and is fastened to the carrier by means of an adhesive which is provided exclusively between each of the two circular-cylindrical support surfaces and the holder, the carrier being brought into connection with the holder exclusively by way of the adhesive.

13. A method of manufacturing a photocopier provided with a light source for illuminating an original, a photosensitive transducer for converting light into a pattern of electric charges, a feed unit for the supply of toner to the photosensitive transducer, and a printing member for printing a toner pattern present on the transducer onto a copy to be manufactured, the photosensitive transducer being provided on a carrier which is rotatable about a centerline about which the carrier is circularly symmetric by means of a drive unit, wherein the carrier is machined by a method in which the carrier is fastened to a holder of a machine tool, which holder is rotatable about said axis of rotation coinciding substantially with the centerline, and the workpiece is subsequently machined by means of a tool which is displaced at least in a direction parallel to the axis of rotation by means of a positioning device of the machine tool, wherein the carrier is provided with two axially spaced apart circular-cylindrical support surfaces, each directed substantially parallel to the centerline, and is fastened to the carrier by means of an adhesive which is provided exclusively between each of the two circular-cylindrical support surfaces and the holder, the carrier being brought into connection with the holder exclusively by way of the adhesive.

* * * * *